Patented May 17, 1938

2,117,554

UNITED STATES PATENT OFFICE 2,117,554

MANUFACTURE OF ORGANIC ANHYDRIDES

William J. Hale, Washington, D. C.

No Drawing. Application September 27, 1934,
Serial No. 745,831

16 Claims. (Cl. 260—123)

This invention concerns a method of reacting carbon monoxide with an organic compound containing a labile hydrogen atom to produce a formic acid derivative. It also concerns the use of such formic acid derivative in preparing certain other organic products, e. g. formic acid and acetic anhydride. As examples of compounds employable according to the present invention may be mentioned fatty acids, alcohols, phenols, mercaptans, and primary and secondary amines.

I have found that by operating in the manner hereinafter described, carbon monoxide can now be reacted at low temperature with an organic compound containing a labile hydrogen atom to form a derivative of formic acid. For instance, carbon monoxide can be reacted at below room temperature: (1) with a fatty acid containing two or more carbon atoms to form a mixed anhydride of formic acid and the higher fatty acid, e. g. formic-acetic anhydride; (2) with an alcohol to form an ester of formic acid; (3) with a primary or secondary amine to form a substituted formamide, e. g. ethyl formamide; etc. Representing the organic reactant by the formula R—Y—H, wherein R is an organic radical, Y is an atom or group other than carbon, and H is a labile hydrogen atom, all such reactons may be illustrated by the equation:—

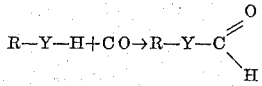

which may be considered specifically as representing the reaction between acetic acid and carbon monoxide to produce formic acetic anhydride.

Certain of the above mentioned formic acid derivatives are highly reactive and can be converted into more valuable products merely by heating the mixtures in which they are formed. For instance, when carbon monoxide is reacted with acetic acid, a mixture containing formic-acetic anhydride and unreacted acetic acid is obtained. Upon heating this mixture, the acetic acid and formic-acetic anhydride react to form acetic anhydride and formic acid, the reaction involved being illustrated by the equation:—

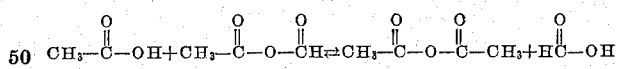

This reaction is driven to completion by distilling the formic acid as it is formed.

To the accomplishment of the foregoing and related ends, the invention consists in the method hereinafter fully described and particularly pointed out in the claims.

My reaction between carbon monoxide and an organic compound containing a labile hydrogen atom is carried out under pressure at a temperature sufficient to permit stirring but below room temperature in the presence of the following auxiliary agents:

(1) A hydrogen halide, preferably hydrogen chloride, (2) A metallic salt, preferably a cuprous halide, which is capable of absorbing carbon monoxide and/or hydrogen halide to form addition compounds therewith, or a mixture of metallic salts having such property, and (3) A trace of water, ammonia, or an organic nitrogen base.

The organic reactant and carbon monoxide are each used in amount representing at least the chemical equivalent of said metallic salt. Hydrogen halide is preferably employed in amount representing not more than the chemical equivalent of the metallic salt, since excess hydrogen halide, over the amount just stated, tends to interfere with the desired reaction. A trace of water promotes the reaction, but water is preferably employed in amount respresenting not more than 0.5, the chemical equivalent of the metal salt. Ammonia, or any organic nitrogen base, e. g. ethyl amine, triethyl amine, aniline, pyridine, piperidine, quinoline, etc., can be used instead of water to promote the reaction if desired. The reaction is preferably carried out under a pressure between 400 and 700 atmospheres, but may be carried out at 5 atmospheres pressure or any pressure thereabove, e. g. at 1000 atmospheres pressure.

I believe my method to involve the formation of an unstable formyl halide from the carbon monoxide and hydrogen halide, and that this formyl halide serves as an intermediate reactant for the formation of my more stable products, but I do not state this to be the true mechanism for my reactions.

In reacting carbon monoxide with acetic acid, I prefer to operate in the following manner. Into an acid resistant bomb or autoclave is charged glacial acetic acid, cuprous chloride, and hydrogen chloride, the latter in amount representing not more than the chemical equivalent of the cuprous chloride. A trace of water, ammonia, or an organic nitrogen base may be added as a reaction promotor, but the other agents, i. e. cuprous chloride, acetic acid, and hydrogen chloride, usually contain sufficient moisture to serve this purpose. The reactor is cooled to below room temperature, preferably to between −10° and −20° C., and carbon monoxide is charged into the same, preferably until the mixture is under a pressure between 400 and 700 atmospheres. The compressed mixture is maintained at below room temperature and agitated for several hours. During this operation, a drop in pressure occurs. Agitation is preferably continued until the pressure becomes substantially constant.

Unreacted carbon monoxide is then released from the reactor and the liquid mixture removed. The liquid mixture may be extracted with ligroin, or other organic solvent capable of dissolving acetic acid but incapable of dissolving formic-acetic anhydride, to remove the unreacted acetic acid and leave the product, formic-acetic anhydride, in the residue. Said anhydride may then be distilled from the residue, preferably in vacuo. On the other hand if the crude mixture, containing formic-acetic anhydride and unreacted acetic acid, is heated to a distilling temperature without first removing the acetic acid, formic acid and acetic anhydride are formed. Said products may be isolated by distilling the mixture. The copper containing compounds remaining after the distillation can be re-employed in successive reactions.

By procedure similar to that described above, other mixed anhydrides, e. g. formic-propionic anhydride, formic-butyric anhydride, etc., may be prepared from carbon monoxide and the necessary fatty acids. Also, each such mixed anhydride may be reacted to produce formic acid and a higher fatty acid anhydride, e. g. propionic anhydride, merely by heating the crude reaction mixture in which it occurs.

Although the above procedure is particularly well adapted to the reaction of carbon monoxide with a fatty acid, it is not limited thereto. By similar procedure, carbon monoxide may be reacted with any other organic compound containing a labile hydrogen atom; for instance:—with an organic sulphonic acid, e. g. ethyl sulphonic acid, benzene sulphonic acid, naphthalene sulphonic acid, etc., to form a corresponding formic-sulphonic acid anhydride; with an alcohol, e. g. ethyl alcohol, benzyl alcohol, etc., to form an ester of formic acid; with a mercaptan, e. g. ethyl mercaptan, thiophenol, etc., to form a corresponding thio-ester of formic acid; with a phenol, e. g. phenol, naphthol, phenylphenol, etc., to form an aryl-ester of formic acid; and with a basic primary or secondary amine, e. g. ethyl amine, diethyl amine, aniline, etc., to form a corresponding substituted formamide. Insofar as I am aware, my reaction is general to all organic compounds containing a labile hydrogen atom.

The following examples illustrate several ways in which the principle of the invention has been employed, but are not to be construed as limiting the invention.

*Example 1*

60 grams of glacial acetic acid and 100 grams of moist cuprous chloride were placed in a I-liter enamel-lined autoclave. The latter was then cooled to −20° C., 36 grams of anhydrous hydrogen chloride was admitted, and thereafter carbon monoxide was passed into the autoclave under a pressure of about 700 pounds, gauge. The autoclave was then sealed and the charge therein agitated at a temperature between −10° and −20° C. for about 4 hours. Thereafter, unreacted carbon monoxide was discharged into a second container and the residual reaction mixture was removed from the autoclave. Acetic acid was extracted from the mixture with ligroin, and the residual material was distilled. There was collected 14.4 grams of formic-acetic anhydride, of boiling point 29° C. at 17 millimeters pressure.

*Example 2*

A mixture of 120 grams of glacial acetic acid, 100 grams of moist cuprous chloride, 36 grams of hydrogen chloride, and a large excess of carbon monoxide was reacted under pressure at a temperature between −10° and −20° C., as in Example 1. The reacted mixture was fractionally distilled under vacuum. There was collected approximately 7.5 grams of formic acid and 16.7 grams of acetic anhydride.

*Example 3*

Into a I-liter autoclave provided with a mechanical stirrer was placed 200 grams of glacial acetic acid, 100 grams of cuprous chloride, and 200 grams of pyridine. The mixture was cooled to about −15° C., after which 36 grams of anhydrous hydrogen chloride was introduced with stirring. Carbon monoxide was then charged into the autoclave under a pressure of approximately 500–600 atmospheres. The compressed mixture was stirred at a temperature between −10° and −20° C. for about 4 hours. The unreacted carbon monoxide was then vented into a second container. The reaction mixture was removed from the autoclave and fractionally distilled. There was collected 18.5 grams of acetic anhydride.

*Example 4*

A mixture of 32 grams of methyl alcohol and 100 grams of cuprous chloride was placed in a I-liter enamel-lined autoclave. The mixture was cooled to about −15° C. and 36 grams of hydrogen chloride was introduced with stirring. Carbon monoxide was then charged into the autoclave at about 400–500 atmospheres pressure. The resultant mixture was stirred at a temperature between −10° and −20° C. for about 4 hours, after which the unreacted carbon monoxide was vented into a second container. The reaction mixture was then removed from the autoclave and fractionally distilled under vacuum. There was obtained 24 grams of methyl formate.

By adding an alkyl ether, e. g. methyl or ethyl ether, to a reaction mixture of the type hereinbefore described, the reaction may if desired be carried out at an extremely low temperature, e. g. −80° C., and the hydrogen halide may be employed in greater proportion than at the higher temperatures. The ether not only serves as a thinning agent for the mixture, but also, at such low temperature, combines with hydrogen halide to form an oxonium salt, thereby permitting use of a larger proportion thereof than can be used at higher temperatures. However, after completing the reaction it is advisable to add a metallic salt of the aforementioned type in amount sufficient to combine with any hydrogen halide which may be liberated from the oxonium salt on warming the mixture, since otherwise such hydrogen halide may react with the desired product and thereby reduce the yield.

Instead of using cuprous chloride in my reaction, I may employ any other metallic salt, or mixture of metallic salts, which is somewhat soluble in the organic reactant and which will react with carbon monoxide and hydrogen halide to form addition compounds therewith. For instance, it is known that halides of the following metals will absorb carbon monoxide to form addition compounds:—copper, iron, ruthenium, osmium, cobalt, rhodium, iridium, nickel, palladium, silver, gold, zinc, cadmium, mercury, and molybdenum. It is also known that halides of copper, platinum, tin, zinc, cadmium, mercury, gold, antimony, bismuth, lead, tellurium, and iridium will combine with hydrogen halide to form additional compounds. Obviously then, a halide of one of the metals copper, platinum, zinc, cadmium, mercury, gold, and nickel is best suited to my purpose, since such salt will absorb both carbon monoxide and hydrogen halide. Of the narrow class of salts just mentioned, cuprous halides, e. g. cuprous iodide, bromide, and chloride, are particularly active and I prefer cuprous chloride.

However, it is not necessary that a single metallic salt capable of combining both with carbon monoxide and hydrogen halide be used in the reaction. Instead, I may employ a mixture of two or more metallic salts, provided the mixture contains at least one salt capable of combining with carbon monoxide and at least one salt capable of combining with hydrogen halide and the several salts are mutually soluble in the organic reactant. For instance, a mixture of silver and tin chlorides has been used successfully in my process.

Due to the toxicity of carbon monoxide, caution must be observed in carrying out a reaction according to the present method.

This application is a continuation in part of my copending application Serial No. 362,449, filed May 11, 1929.

Other modes of applying the principles of my invention may be employed instead of those explained, change being made as regards the method herein disclosed, provided the step or steps stated by any of the following claims or the equivalent of such stated step or steps be employed.

I claim:

1. The method which comprises treating an organic compound containing a labile hydrogen atom adjacent to a non-metallic element other than carbon with carbon monoxide at superatmospheric pressures from about 5 to about 1000 atmospheres and a temperature between substantially —10 and —20° C. in the presence of a hydrogen halide and a metal salt capable of absorbing carbon monoxide and hydrogen halide.

2. The method which comprises treating, at superatmospheric pressures from about 5 to about 1000 atmospheres and a temperature between approximately —10 and —20° C., an organic compound containing a labile hydrogen atom adjacent to a non-metallic element other than carbon with carbon monoxide in the presence of a hydrogen halide and a metal salt capable of absorbing carbon monoxide and hydrogen halide, the organic compound and carbon monoxide each being used in amount greater than the chemical equivalent of the metal salt, the hydrogen halide being used in amount not exceeding the chemical equivalent of said metal agent, and the mixture being stirred during the treatment.

3. The method which comprises treating a mixture of an organic compound containing a labile hydrogen atom adjacent to a non-metallic element other than carbon, hydrogen chloride, and a metal halide capable of absorbing carbon monoxide and hydrogen halide, with carbon monoxide at pressures from about 5 to about 1000 atmospheres and at a temperature not far above the freezing point of the mixture, while stirring the mixture, the treatment being carried out in the presence of a trace of water.

4. The method which comprises treating a mixture of an organic compound containing a labile hydrogen atom adjacent to a non-metallic element other than carbon, hydrogen chloride and cuprous chloride, with carbon monoxide at a pressure between about 400 and about 700 atmospheres and at a temperature not far above the freezing point of the mixture, while stirring the mixture, the organic compound and carbon monoxide each being used in amount exceeding the chemical equivalent of the cuprous chloride, the hydrogen chloride being employed in amount not exceeding the chemical equivalent of the cuprous chloride, and the treatment being carried out in the presence of a trace of water.

5. In a method of making an organic acid anhydride, the step which consists in treating a lower fatty acid with carbon monoxide at superatmospheric pressures from about 5 to about 1000 atmospheres and at a temperature between approximately —10 and —20° C. in the presence of hydrogen halide and a metal salt capable of absorbing carbon monoxide and hydrogen halide.

6. In a method of making an organic acid anhydride, the step which consists in treating a mixture of acetic acid, hydrogen chloride and cuprous chloride, with carbon monoxide at a pressure between about 400 and about 700 atmospheres and at a temperature between approximately —10 and —20° C. while stirring the mixture, the acetic acid and carbon monoxide each being used in amount exceeding the chemical equivalent of the cuprous chloride, the hydrogen chloride being used in amount not exceeding the chemical equivalent of cuprous chloride and the treatment being carried out in the presence of a trace of water.

7. In a method of making acetic anhydride, the steps which consist in mixing cuprous chloride with more than its chemical equivalent of acetic acid, less than its chemical equivalent of hydrogen chloride, and a trace of water, agitating the mixture at a pressure between about 400 and about 700 atmospheres and at a temperature between approximately —10 and —20° C., with carbon monoxide in proportion exceeding the chemical equivalent of the cuprous chloride, and thereafter distilling the reacted mixture to separate acetic anhydride.

8. A process of preparing acetic anhydride which comprises bringing a gaseous mixture of hydrogen chloride with more than its molecular equivalent of carbon monoxide under superatmospheric pressures between about five and about one thousand atmospheres of carbon monoxide into contact in the presence of a mixture of cuprous chloride and cuprous bromide and of glacial acetic acid, in the anhydrous state, at a temperature between approximately —10 and —20° C., and thereafter heating and fractionally condensing evolved acetic anhydride.

9. A process of preparing the anhydride of a lower aliphatic acid containing at least two carbon atoms, which comprises bringing carbon monoxide and a hydrogen halide together as reactants in anhydrous condition and under superatmospheric pressure from about 5 to about 700 atmospheres and in the presence of cuprous chloride and capable of forming molecular compounds with both said reactants, and in the presence of the acid whose anhydride is to be formed, at a temperature between approximately −10 and −20° C., heating the resulting product, and condensing the evolved vapors of the anhydride.

10. A process of producing anhydrides of lower saturated aliphatic acids containing at least two carbon atoms, which includes the steps of bringing carbon monoxide and hydrogen halide together as reactants in anhydrous state and with the partial pressure of carbon monoxide of several atmospheres in the presence of the said acid and a cuprous halide while maintaining the mixture in liquid phase at a temperature between approximately −10 and −20° C., and thereafter boiling the product and condensing the anhydride from the vapors.

11. A process of producing anhydrides of lower saturated aliphatic acids containing at least two carbon atoms, which includes the steps of bringing carbon monoxide and hydrogen chloride together as reactants in anhydrous state while maintaining the partial pressure of the carbon monoxide at from about 5 to 700 atmospheres in the presence of the said acid and a cuprous chloride while maintaining the mixture in liquid phase at a temperature between approximately −10 and −20° C., and thereafter boiling the product and condensing the anhydride from the vapors.

12. A process of preparing anhydrides of lower saturated aliphatic acids containing at least two carbon atoms, which includes the steps of bringing a hydrogen halide in anhydrous state in the presence of the said acid and a cuprous halide while maintaining the mixture in liquid phase at a temperature between approximately −10 and −20° C., introducing carbon monoxide in excess of equi-molecular proportion to the hydrogen halide until the total of the partial pressures of carbon monoxide and hydrogen halide is higher than atmosphereic pressure and of the order of from about 5 to about 1000 atmospheres, the mixture being maintained in anhydrous state, and thereafter boiling the product at substantially atmospheric pressure.

13. A process of producing acetic anhydride which comprises bringing carbon monoxide and a hydrogen halide in anhydrous state into contact in the presence of a cuprous halide and glacial acetic acid at a temperature between approximately −10 and −20° C. and under a total pressure higher than atmospheric pressure about 5 atmospheres and thereafter boiling the resulting product in the presence of remaining unchanged glacial acetic acid.

14. A process of producing acetic anhydride which comprises bringing carbon monoxide and a hydrogen halide in anhydrous state into contact in the presence both of glacial acetic acid and of a mixture of cuprous chloride and cuprous bromide, maintaining the mixture at a temperature between approximately −10 and −20° C. under a partial pressure of carbon monoxide greater than atmospheric pressure so that the total pressure is higher than atmospheric pressure and of the order of from about 5 to 1000 atmospheres, thereafter boiling the resulting liquid mixture in the presence of remaining unchanged glacial acetic acid, and condensing the evolved vapors of acetic anhydride.

15. A process of producing acetic anhydride which comprises bringing carbon monoxide and a hydrogen halide in anhydrous state into contact in the presence of a cuprous halide and glacial acetic acid at a temperature between approximately −10 and −20° C., maintaining an excess of carbon monoxide so that the total pressure and of the order of from about 5 to about 1000 atmospheres is above atmospheric pressure, and thereafter boiling the product in the presence of remaining unchanged glacial acetic acid.

16. The method of preparing mixed organic acid anhydride containing the formyl radicle as one arm, which includes the step of bringing carbon monoxide and a hydrogen halide together as reactants in anhydrous condition and under increased partial pressures of carbon monoxide and hydrogen halide totaling higher than atmospheric pressure and of the order of from about 5 to about 1000 atmospheres, in the presence of a copper halide and a fatty acid, at a temperature between approximately −10 and −20° C.

WILLIAM J. HALE.